(12) United States Patent
Bhatia

(10) Patent No.: US 6,288,895 B1
(45) Date of Patent: Sep. 11, 2001

(54) APPARATUS FOR COOLING ELECTRONIC COMPONENTS WITHIN A COMPUTER SYSTEM ENCLOSURE

(75) Inventor: Rakesh Bhatia, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/028,204

(22) Filed: Feb. 23, 1998

Related U.S. Application Data

(63) Continuation-in-part of application No. 08/723,905, filed on Sep. 30, 1996.

(51) Int. Cl.$^7$ ................................. G06F 1/20; H05F 7/20
(52) U.S. Cl. ........................ 361/687; 361/700; 361/687; 165/86; 165/104.33; 174/15.2
(58) Field of Search ..................................... 361/687, 699, 361/700, 719, 709; 165/80.3, 104.33, 104.34, 82, 86; 174/15.2, 16.3

(56) References Cited

U.S. PATENT DOCUMENTS

| | | | |
|---|---|---|---|
| 4,449,576 | 5/1984 | Baum et al. | 165/104.33 |
| 4,966,226 | * 10/1990 | Hamburgen | 165/104.33 |
| 5,095,404 | * 3/1992 | Chao | 361/687 |
| 5,159,972 | 11/1992 | Gunnerson et al. | 165/32 |
| 5,168,919 | * 12/1992 | Berenholz et al. | 165/80.3 |
| 5,195,576 | 3/1993 | Hatada et al. | 165/80.3 |
| 5,198,889 | 3/1993 | Hisano et al. | 257/678 |
| 5,216,580 | * 6/1993 | Davidson et al. | 361/687 |
| 5,313,362 | 5/1994 | Hatada et al. | 361/709 |
| 5,361,188 | 11/1994 | Kondou et al. | 361/695 |
| 5,402,312 | 3/1995 | Kinjo et al. | 361/695 |
| 5,409,055 | 4/1995 | Tanaka et al. | 165/104.33 |
| 5,414,591 | 5/1995 | Kimura et al. | 361/695 |
| 5,458,189 | 10/1995 | Larson et al. | 165/104.33 |
| 5,513,070 | 4/1996 | Xie et al. | 361/700 |
| 5,583,316 | 12/1996 | Kitahara et al. | 174/16.3 |
| 5,588,483 | 12/1996 | Ishida | 165/86 |
| 5,598,320 | * 1/1997 | Toedtman et al. | 361/687 |
| 5,606,341 | * 2/1997 | Aguilera | 361/699 |
| 5,621,613 | 4/1997 | Haley et al. | 361/687 |
| 5,646,822 | 7/1997 | Bhatia et al. | 361/687 |
| 5,646,824 | 7/1997 | Ohashi et al. | 361/699 |

FOREIGN PATENT DOCUMENTS

| | | | |
|---|---|---|---|
| 325901 | 2/1997 | (CN) | G06F/1/20 |
| 325902 | 3/1997 | (CN) | G06F/1/20 |
| 4-113332 | 5/1992 | (JP) | H01L/27/14 |

OTHER PUBLICATIONS

IBM Technical Disclosure Bulletin "Solid–State Enhanced Cooling Package" vol. 22, No. 8A Jan. 1980 p. 3312.

* cited by examiner

*Primary Examiner*—Leo P. Picard
*Assistant Examiner*—Lisa Lea-Edmonds
(74) *Attorney, Agent, or Firm*—Jeffrey S. Draeger

(57) ABSTRACT

A heat generating component such as a microprocessor, in a small form factor, low profile electronic device such as a laptop computer is cooled by using an elongated hollow heat exchanger with a fan at one end of the heat exchanger. A heat pipe, having two ends, has one end thermally coupled to the heat exchanger and the other end thermally coupled to the heat generating component. A heat sink thermally coupled to the other end of the heat pipe, in thermal contact with the heat producing component may be used. In a laptop computer having a four vertically extending side walls including a front wall a back wall and two side walls where the heat generating component is a microprocessor, the heat exchanger can extends in a direction adjacent and parallel to one of the side walls, with an air outlet formed in one of said front and rear walls and an air inlet in the other of said front or rear walls or the side wall to which the heat exchanger is adjacent.

29 Claims, 10 Drawing Sheets

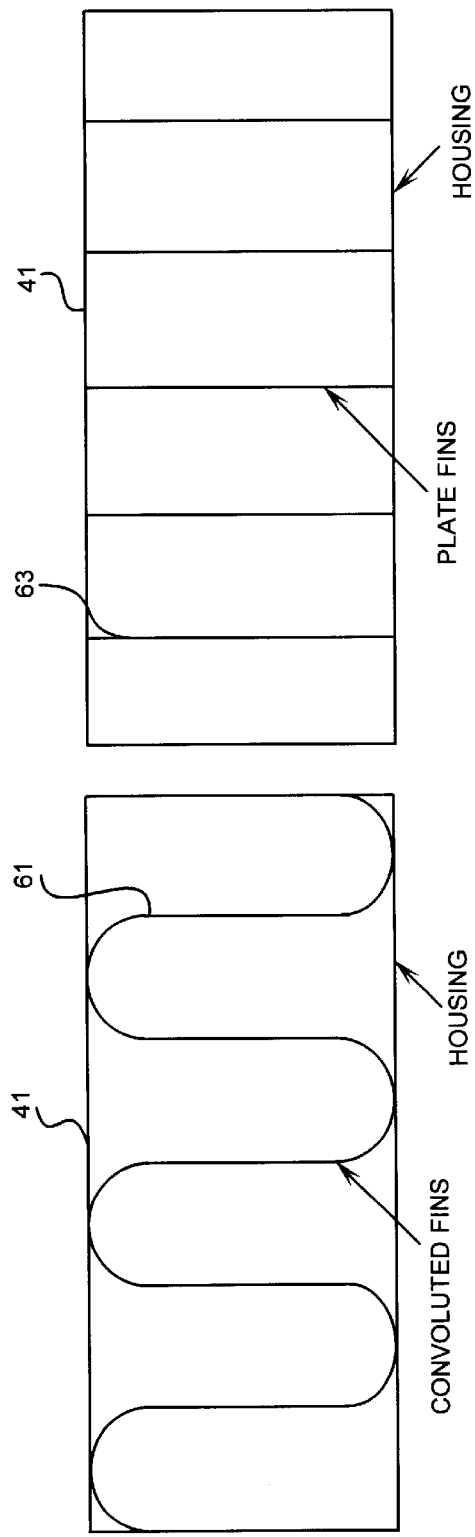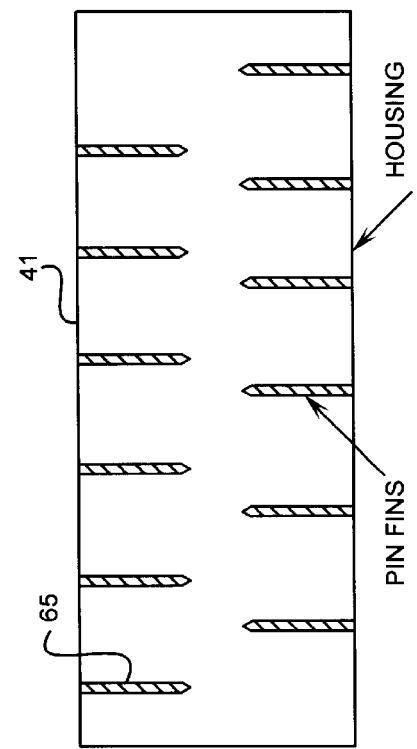
FIG. 5A
FIG. 5B
FIG. 5C

APPARATUS FOR COOLING ELECTRONIC COMPONENTS WITHIN A COMPUTER SYSTEM ENCLOSURE

CROSS-REFERENCE TO RELATED APPLICATIONS

This is a continuation-in-part application of pending prior application Ser. No. 08/723,905 entitled "A FAN BASED HEAT EXCHANGER" filed on Sep. 30, 1996.

FIELD OF THE INVENTION

The present invention relates to the cooling of electronic components which generate high amounts of heat in general and more particularly to a method and apparatus for removing heat from an electronic heat generating component in an electronic system having a small form factor.

BACKGROUND OF THE INVENTION

A number of present day electronic components utilized, for example, in computer systems, generate large amounts of heat. These components, such as microprocessors and associated components are typically encapsulated in plastic or ceramic from which a plurality of leads extend. The integrated circuit (IC) is mounted to a printed circuit board either by direct soldering or through a connector which is soldered to the printed circuit board. In a typical personal computer system, a processor, which in most cases in current systems is a high speed processor which generates a great deal of heat, is mounted on a printed circuit board known as a motherboard, along with a plurality of other components that support the processor such as memory circuits. Also contained within the personal computer housing are additional circuits or circuit boards such as video cards, facsimile-modem cards, etc. The housing may also contain a power supply, supplying power to all of the various components.

As explained in co-pending application Ser. No. 08/686,856, filed May 31, 1996 and assigned to the same assignee as the present invention, the disclosure of which is hereby incorporated by reference in its entirety, it is desirable to have a high rate of heat transfer from the IC package in order to maintain junction temperatures within the IC inside safe operating limits. As noted, modern microprocessors typically employ millions of transistors in internal circuitry that requires some type of cooling mechanism to avoid excessive junction temperatures that may effect the performance of the circuit and can cause permanent degradation of the device. As noted in that application, this is a particularly difficult problem in the design of computer system enclosures which have a small form factor such as laptop and notebook computers. However, heat removal also can constitute a problem in other types of systems which have high power profile components located within a small form factor or thin profile electronic device.

Aside from the possibility of affecting the performance of the circuits in the IC and degradation of those circuits, high heat generating components which are located within consumer electronic devices, such as laptop computers, can create hot spots at certain locations along the external casing of the devices. These hot spots can be uncomfortable to touch and may even cause burns. This is a further reason for conducting heat away from these hot spots and cooling the components generating them to avoid injury to users.

The aforementioned application describes prior art methods used to remove heat from heat generating components located within the confines of a computer enclosure, which include the simple attachment of finned-heat sinks; the development of finned-heat sinks with intricate fins; the use of large flat heat spreading plates to which an IC is directly or indirectly attached; and the thermal coupling of the integrated circuit to a heat spreading plate by a heat pipe or other low resistance thermal path. As described, more recently, forced cooling air has been used to cool one side of a heat spreading plate having an integrated circuit attached to the other side. The prior application recognizes that these prior art methods do not provide sufficient heat removal capacity and/or efficiency needed to cool current and future high performance microprocessors and other high heat generating devices in portable general purpose or other thin profile electronic devices.

The solution proposed in that application is the use of an air duct comprising a thermally conductive housing having internal fins dispersed along the internal walls of the air duct. An airflow generator, e.g., a fan, produces an airflow that is directed from an inlet port located at or near the center of the air duct to first and second exit ports located adjacent opposite ends of the duct. The heat generating integrated circuit such as a microprocessor is thermally coupled to the thermally conductive housing by means of a low resistance thermal path such as a heat pipe.

Such an arrangement efficiently removes large amounts of heat. However, the location of the inlet port near the center of the air duct as described in the aforementioned application requires openings above the air inlet in the housing of the device. In the case of a laptop computer this can cause a problem, since in many current laptop computers, a convenient place to locate such openings is not available because it would occur in the area of the keyboard.

Because of this, there is a need for an improved apparatus and method to solve the problem of cooling high heat generating components such as microprocessors within portable consumer electronic and computer devices, which retain the highly efficient cooling performance of the aforementioned application within the available space, but avoid the problem of drawing air in through the top surface of the device in order that it can be used with a device such as a laptop computer which does not have an area on its top surface available for air intake.

SUMMARY OF THE INVENTION

The present invention provides such an apparatus for cooling a heat generating component through the use of an elongated hollow heat exchanger with a fan at one end of the heat exchanger. A heat pipe has one end thermally coupled to the heat exchanger and the other end adapted to be thermally coupled to the heat generating component. When used in a small form factor, low profile electronic device such as a laptop computer, the heat generating component, e.g., a microprocessor, is coupled to the heat pipe. In one embodiment, a heat sink is thermally coupled to the heat pipe, the heat sink being in thermal contact with the heat generating component. In other embodiments, the heat pipe is attached directly to the heat generating component.

Various embodiments of the present invention are disclosed including one in which one end of the heat pipe is in thermal contact with the outside surface of the heat exchanger duct. Preferably there are members, e.g., fins, attached to the inner surface of the heat exchanger duct increasing its internal surface area. The heat exchanger duct may have a rectangular or cylindrical cross section.

The members on the inside may take various forms such as convoluted fins, plate fins or pin fins. In another embodiment, the heat pipe extends through the center of the hollow heat exchanger duct and a plurality of longitudinal radial fins extend between the heat pipe and the inside wall of the heat exchanger duct, supporting the heat pipe. In the illustrated embodiments, the fan draws air through the heat exchanger duct. It could equally well blow air into the heat 20 exchanger duct.

In one embodiment, the heat exchanger extends in a direction adjacent and parallel to one of the side walls of the laptop housing. An air outlet is formed in the rear wall and an air inlet in the side wall to which the heat exchanger is adjacent. The fan is disposed between the air outlet and the one end of the heat exchanger. In some embodiments there is a curved deflector between the inlet opening and the other end of the heat exchanger and/or an expansion duct between the one end of the heat exchanger and the fan.

The arrangement of the present invention allows the use of the vertical walls as an air inlet and outlet, thus avoiding interference with elements such as a keyboard on the top of the device. In one embodiment this is done by thermally coupling one end of a heat pipe having two ends, to the heat generating component, such as a microprocessor, thermally coupling the other end of the heat pipe to an elongated hollow heat exchanger and generating a flow of air through the hollow heat exchanger using a fan disposed at one end while drawing air in through the other end.

In another embodiment, the condenser portion of the heat pipe is configured to include fins to increase the heat transfer area of the heat pipe. In such an embodiment, the heat exchanger includes a housing for directing an air flow across the heat pipe fins.

BRIEF DESCRIPTION OF THE DRAWINGS

FIGS. 5A–5C illustrate a number of possible internal fin arrangements for a heat exchanger duct such as the duct of FIG. 4A.

DETAILED DESCRIPTION

Figure 1:
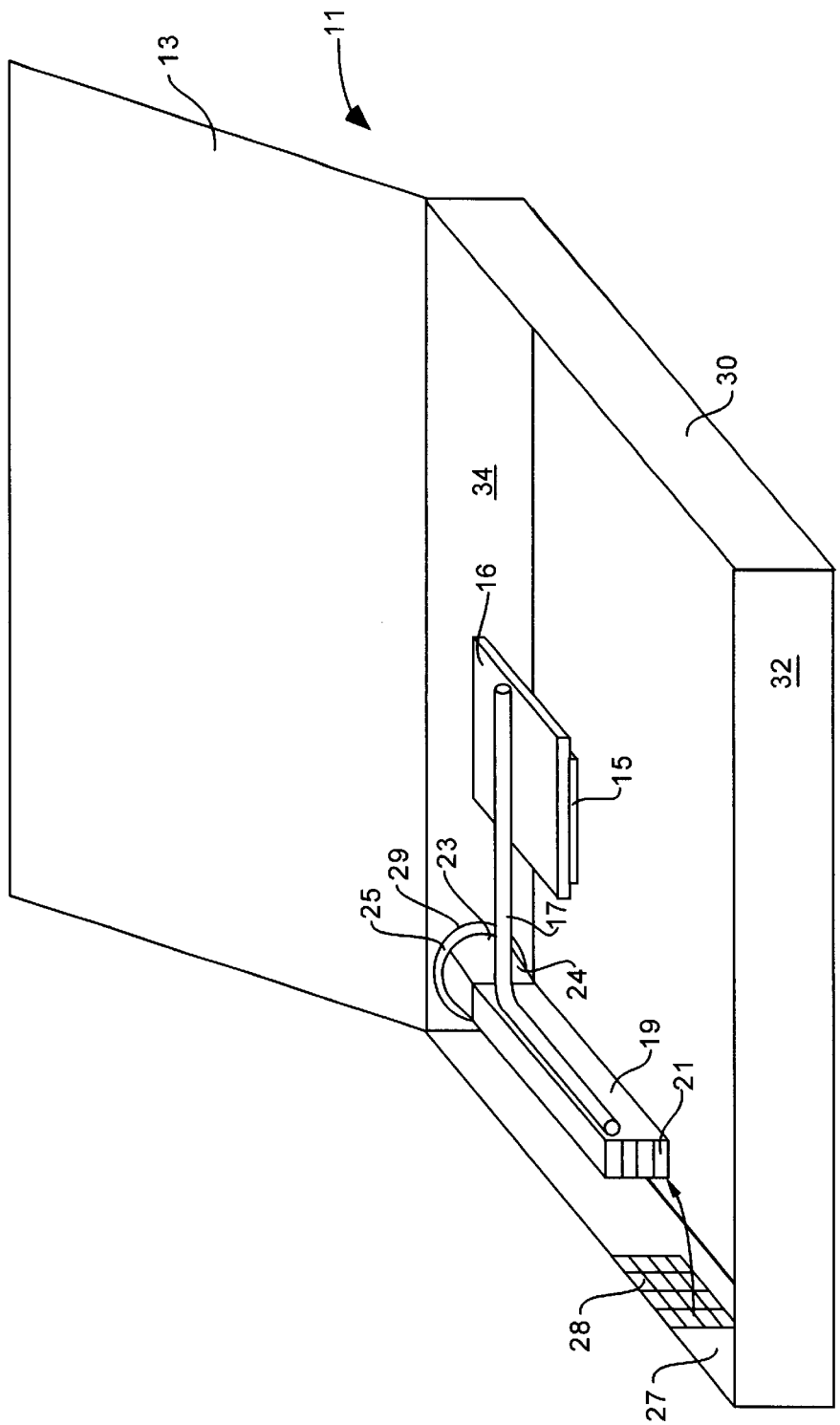
FIG. 1 is a perspective view of the heat exchanger according to the present invention in a notebook computer.

FIG. 1 is a perspective view of the heat exchanger according to the present invention. Illustrated is a notebook or laptop computer 11 including an enclosure with vertical side walls 27 and 30, a vertical front wall 32 and a vertical rear wall 34. As is conventional, the laptop includes a display 13. The laptop is shown with the top of its enclosure, which would contain the keyboard, removed. Only the components related to the present invention are illustrated inside the laptop 11. It will, of course, include many additional components, many of which generate heat. Within the enclosure of the notebook computer 11 is a central processing unit 15 which is a high heat generating component from which heat must be removed to both maintain the performance of the processor and also to avoid hot spots on the housing of the computer 11. The processor is connected to a heat sink 16 which in turn is thermally connected to a heat pipe 17. The heat pipe 17 is thermally coupled to an elongated hollow heat exchanger 19 with openings at its opposed ends. The heat exchanger 19 has an air inlet 21 at one end and an air outlet 23 at the other end. Air is drawn through the heat exchanger, which has a hollow interior with an increased surface area (e.g., using finned surfaces) by a fan 25. As illustrated, an expansion duct 24 can be provided at the outlet 23 coupling it to the fan 25. An air inlet 28 is formed in the side wall 27 of the housing 11 of the computer. An air outlet opening 29 is formed in the rear wall 34 of the housing 11 of the computer.

The use of an elongated hollow heat exchanger 19 which has its air inlet 21 at one end and air outlet 23 at the other end permits an arrangement in which the air inlet opening 28 and the air outlet opening 29 can both be formed in vertical walls such as vertical side wall 27 of the laptop 11. Although these openings are shown as being located in the side wall 27 and rear wall 34 of the laptop 11, it would, of course, be possible to locate them in different ones of the vertical walls of the housing of the laptop 11. For example, the air inlet could be in the front wall 32 and the air outlet in the rear wall 34. Alternatively, the heat exchanger 19 could extend in a direction perpendicular to that in which it is shown with the air outlet being in the side wall 27 and the air inlet either in the front wall 32 or the side wall 30. In addition, as indicated by an arrow originating at the inlet 28, inside air is drawn into the heat exchanger aiding in the cooling of other components within the enclosure of the laptop computer 11. Furthermore, although shown as employed in a notebook or laptop computer, the present invention can also be employed with other electronic devices, particularly those having a small form factor with a low profile.

Figure 2:
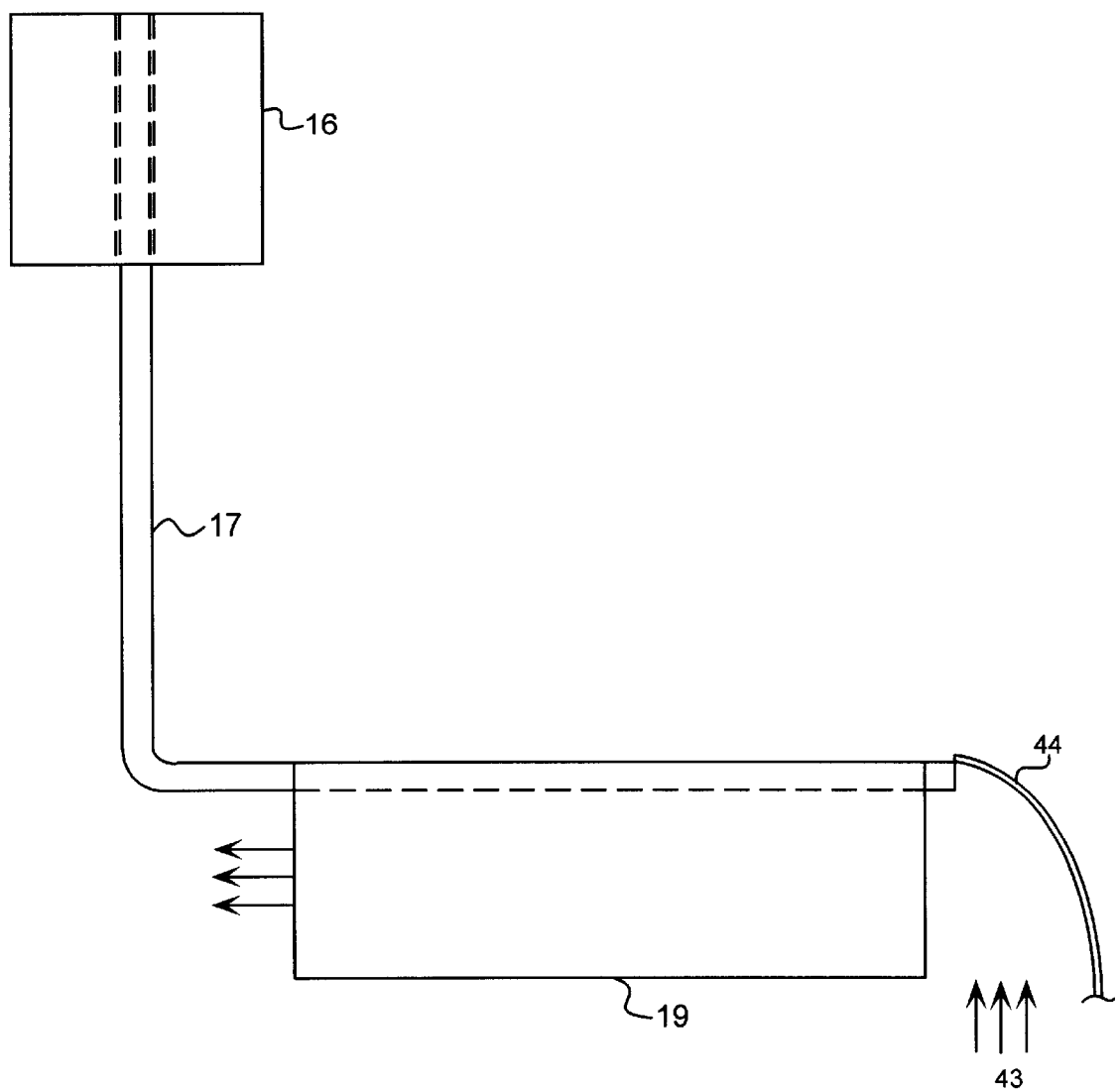
FIG. 2 is a plan view of the connection between the heat sink of the heat generating component and the heat exchanger via a heat pipe.

FIG. 2 shows further details concerning an arrangement according to the present invention. The heat sink 16 for the CPU 15 of FIG. 1 is in thermal contact with the heat pipe 17 which is bent at a 90° angle. The heat pipe 17 is in contact with the heat exchanger 19 along one surface thereof. As illustrated, a deflector 44 can be provided to deflect air coming in the direction of arrows 43 from the opening 28 into the housing into the interior of the heat exchanger 19.

Figure 3A:
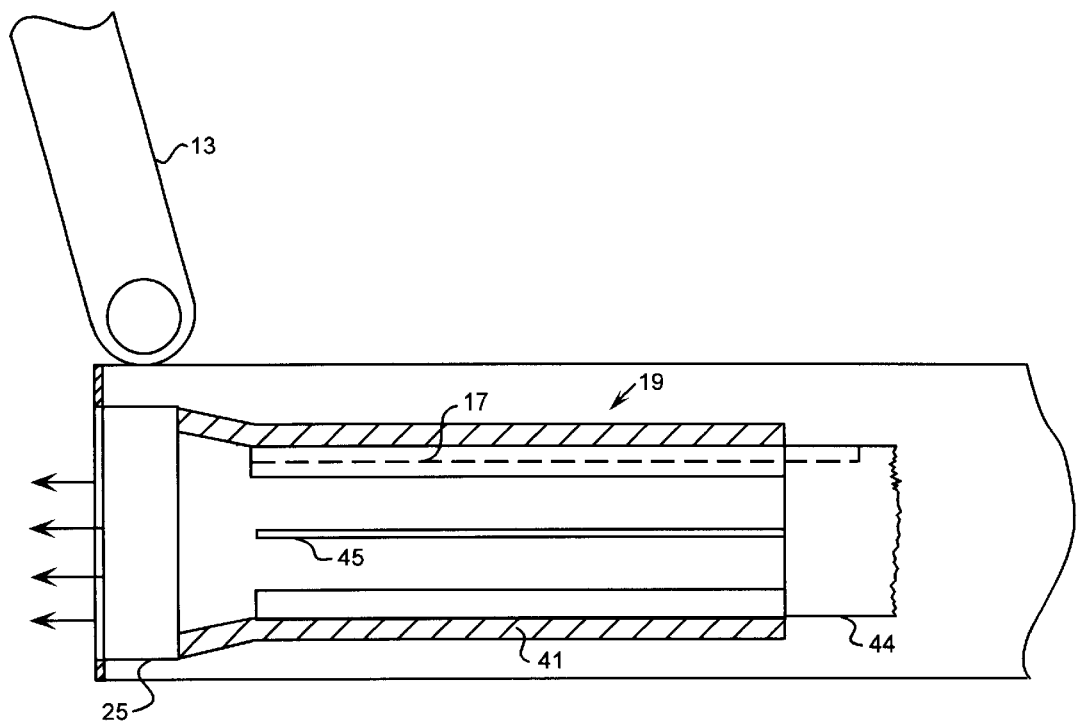
FIGS. 3A and 3B are cross sectional side and front views respectively through the heat exchanger within the housing of the computer.
Figure 3B:
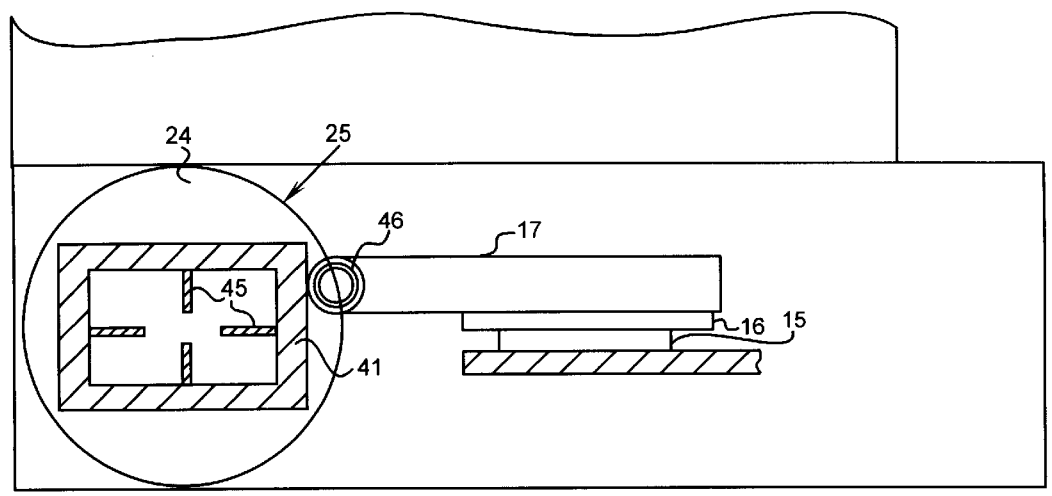

FIGS. 3A and 3B are cross sectional side and front views respectively through the heat exchanger 19 within the housing of the computer. As can be seen from FIG. 3B, in one embodiment the heat exchanger includes a duct 41 with a rectangular cross section. Within the interior of the heat exchanger duct 41 are a plurality of fins 45 to increase the surface area in contact with the air moving through the duct 41. The heat pipe 17 is shown in FIG. 3B adjacent to and in thermal contact with the duct 41 of the heat exchanger 19. In conventional fashion, as described in the aforementioned co-pending application, the heat pipe 17 includes a wick 46 and contains a working fluid which is evaporated by the heat generated at the heat sink 16 associated with the heat generating component, i.e., the CPU 15. The vapor is condensed along the surface of the heat pipe in contact with the heat exchanger 19 permitting the condensed fluid to then be wicked back to the heated end of the heat pipe where it is again condensed, forming a close system. FIG. 3A also shows the location of the fan 25 and deflector 44.

Figure 4A:
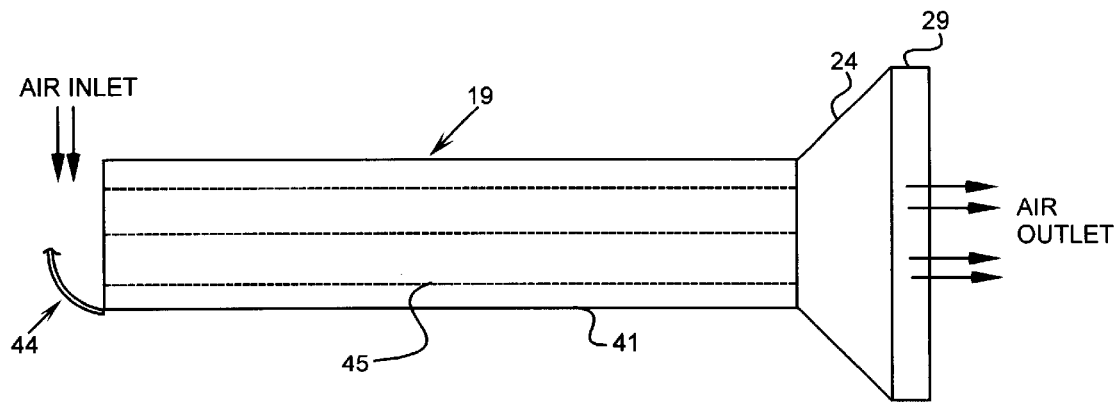
FIGS. 4A–E illustrate various possible arrangements of the heat exchanger.
Figure 4B:
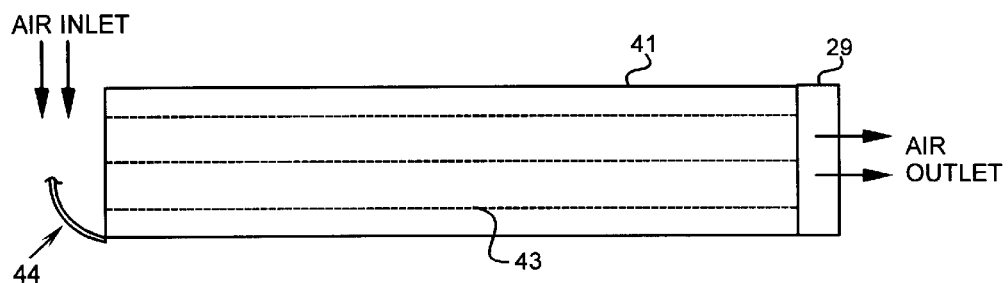

FIGS. 4A–E illustrate various possible arrangements of the heat exchanger 19. As illustrated in FIG. 4A, the heat exchanger has a duct 41 with a round or rectangular cross section at the outlet end of which is the expansion duct 24 to which the fan 25 is coupled to draw air through the duct 41. The duct 41 has fins 45 on its internal surface which direct the air through an air outlet such as the air outlet 25 shown in FIG. 1. Also included is the optional flow turning deflector 44 which is useful in the case where the air inlet is in a wall parallel to the orientation of the heat exchange duct 44 such as the air inlet opening 28 shown in FIGS. 1 and 2. FIG. 4B shows a heat exchanger duct 41 of cylindrical cross section in which the fan 25 is of the same diameter as the duct 41. Again, the optional flow turning deflector 44 at the air inlet is shown.

Figure 4C:
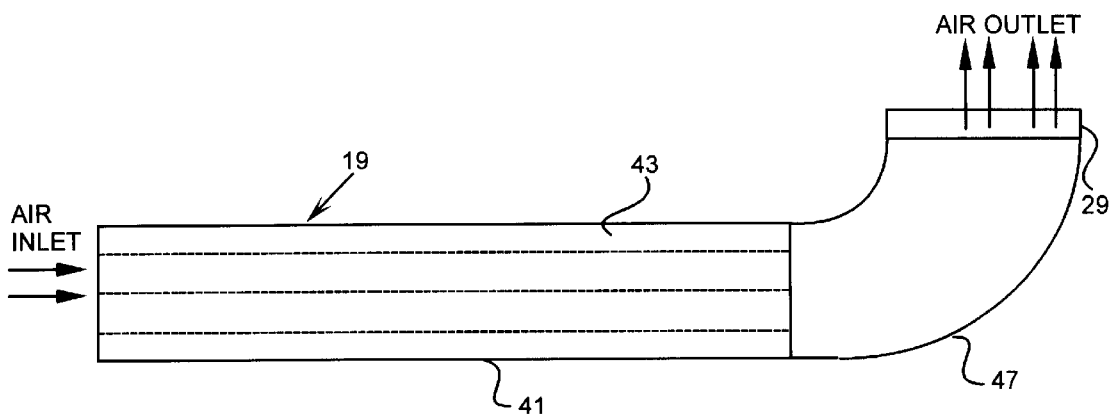
Figure 4D:
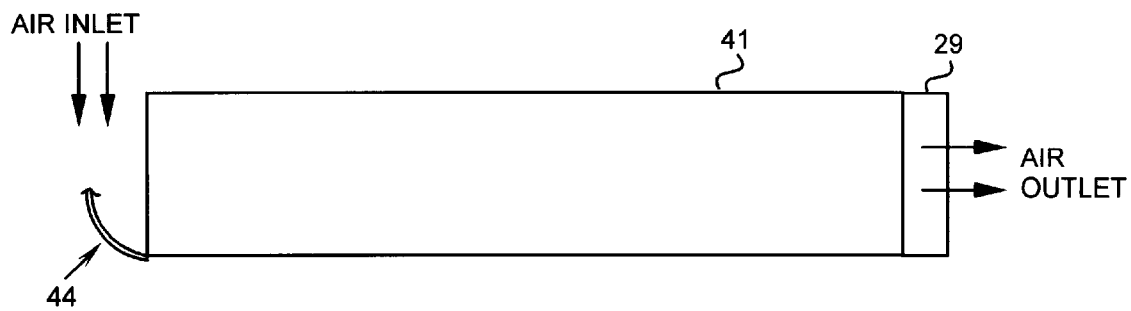
Figure 4E:
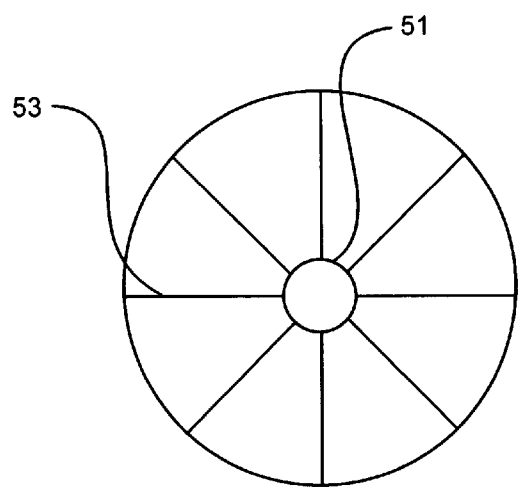

FIG. 4C shows a heat exchanger duct 41 which has at its outlet a flow turning and expansion duct 47 to which the fan 29 is coupled. There is no flow turning deflector at the air inlet. In this case, with reference to FIG. 1, the air inlet in the vertical wall of the housing would be located in the front wall 32 and the air outlet in the sidewall 27. FIG. 4D shows a further embodiment similar to that of FIG. 4B with a fan 29 of the same size as the duct 41. However, in this embodiment, as illustrated by FIG. 4E, which is a cross sectional view of the heat exchanger of FIG. 4D, a heat pipe 51 is located in the center of the duct 41. The heat pipe is supported by longitudinal radially extending fins 53.

FIGS. 5A–5C illustrate a number of possible internal fin arrangements for a heat exchanger duct such as the duct 41 of FIG. 4A. In each case, the duct is shown as a rectangular duct. Thus, in FIG. 5A within the duct housing 41 of the heat exchanger 19, convoluted fins 61 are provided. In the embodiment of FIG. 5B plate fins 63 are used and in the embodiment of FIG. 5C pin fins 65 are used. These are given as examples only; any type of fin known in the art is usable for this purpose. The arrangements of FIGS. 5A, B and C can be manufactured using well established techniques, for example, the extrusion of pin or plate fins or brazing of convoluted fins such as in FIG. 5A to the base. In the arrangement of FIG. 5A the convoluted fins are bonded to the rectangular shroud or duct 41.

Figure 6:
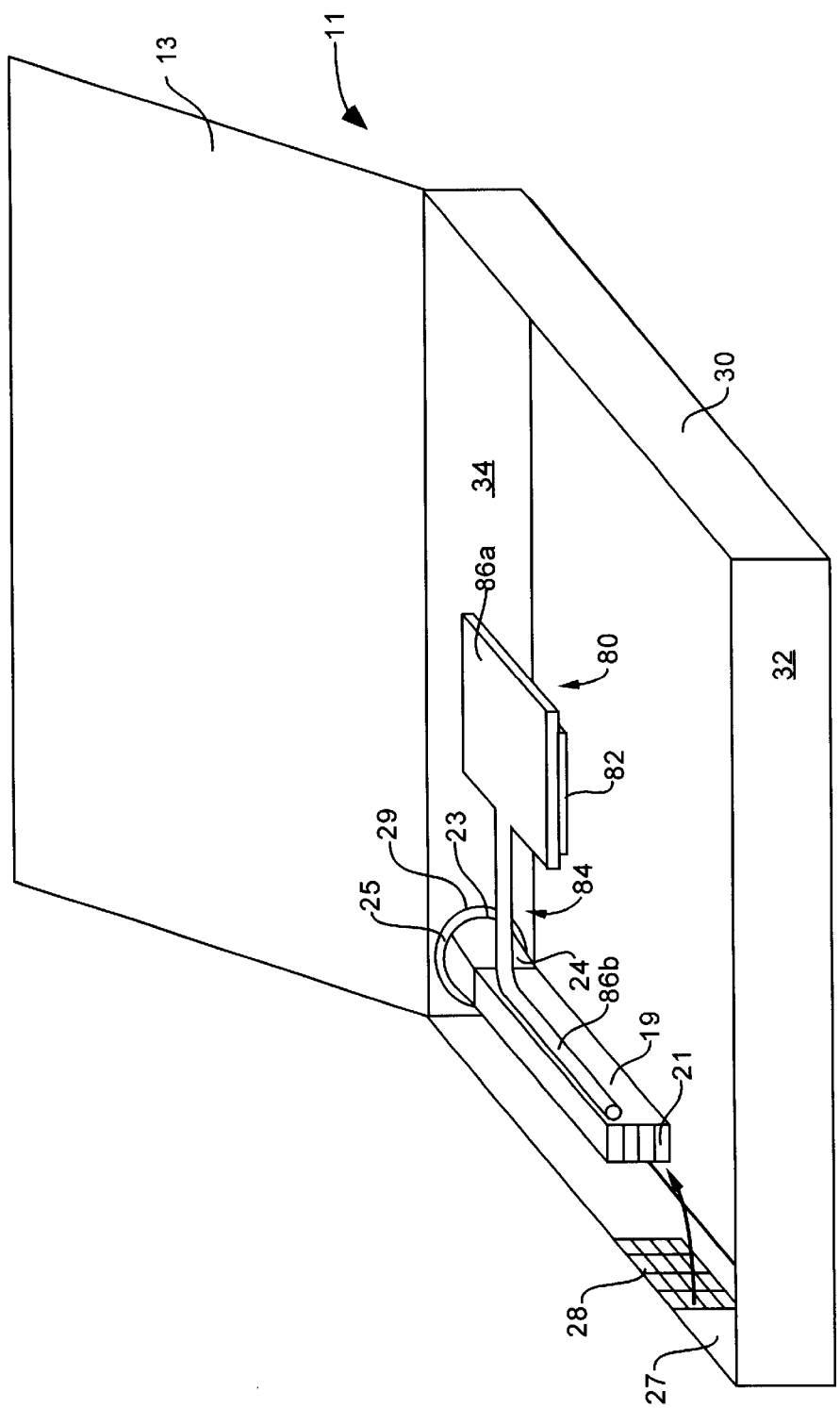
FIG. 6 is a perspective view of another embodiment of the present invention.

Turning now to FIG. 6, another embodiment of the present invention is shown. The computer assembly includes an integrated circuit device 80 comprising a semiconductor substrate 82. A heat pipe 84 is configured to remove heat away from integrated circuit device 80 and into heat exchanger 19. Heat pipe 84 includes an evaporator portion 86a and a condenser portion 86b. Evaporator portion 86a has a flat heat pipe configuration and is attached directly to the semiconductor substrate 82 of device 80 by a thermal adhesive. The direct atachment of heat pipe 84 to the semiconductor substrate increases the thermal efficiency of the heat removal system by minimizing the thermal resistance between the integrated circuit device 80 and heat exchanger 19. In the embodiment of FIG. 6, the evaporator portion 86a of heat pipe 84 is shaped and sized to have a surface area that is approximately equal to the surface area of the semiconductor substrate. It is important to note, however, that the present invention is not limited to any particular heat pipe configuration. For example, heat pipe 84 may include a flat heat pipe configuration, a circular heat pipe configuration, or any of a variety of other shapes or combination of shapes.

Figure 7:
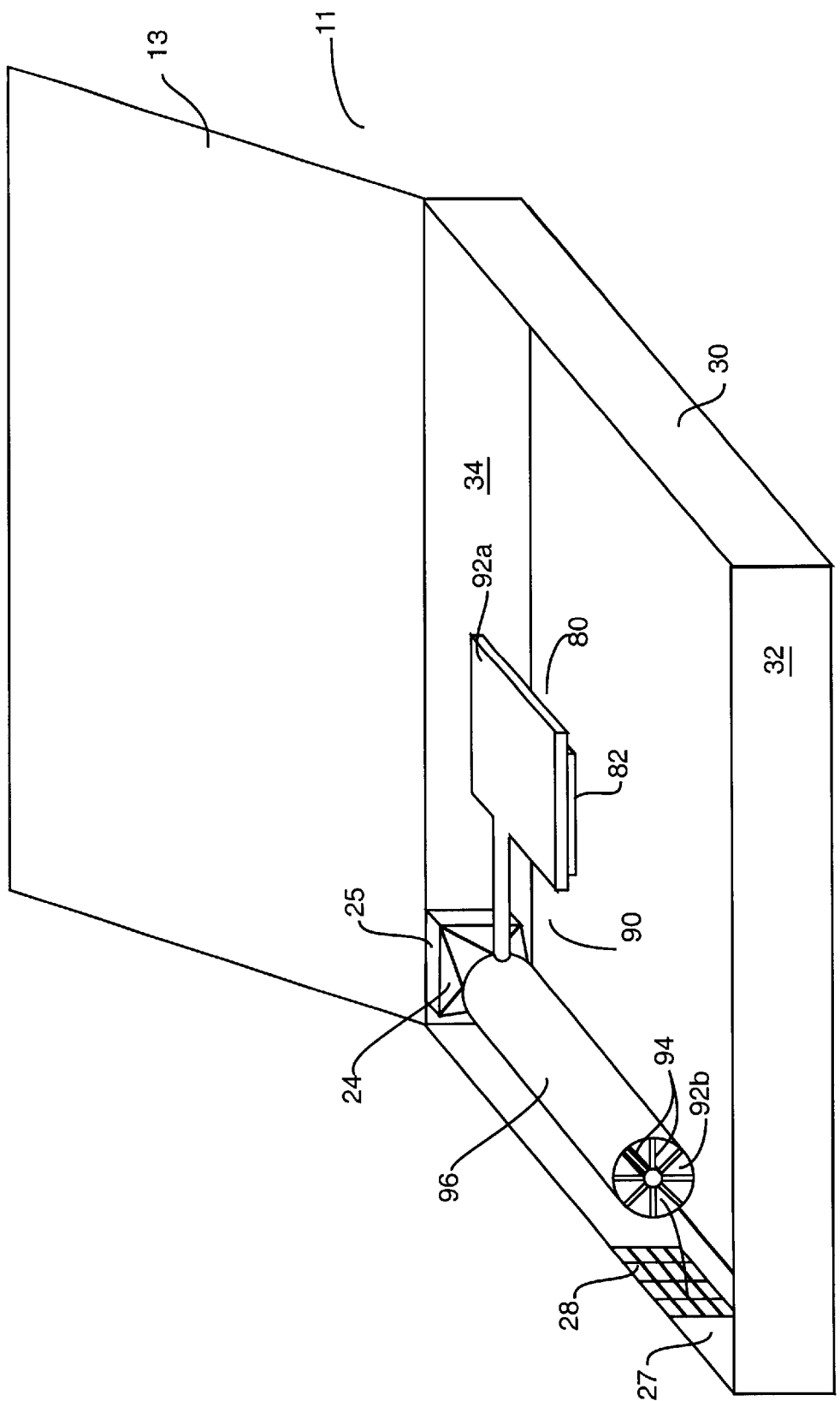
FIG. 7 is a perspective view of yet another embodiment of the present invention.
Figure 8:
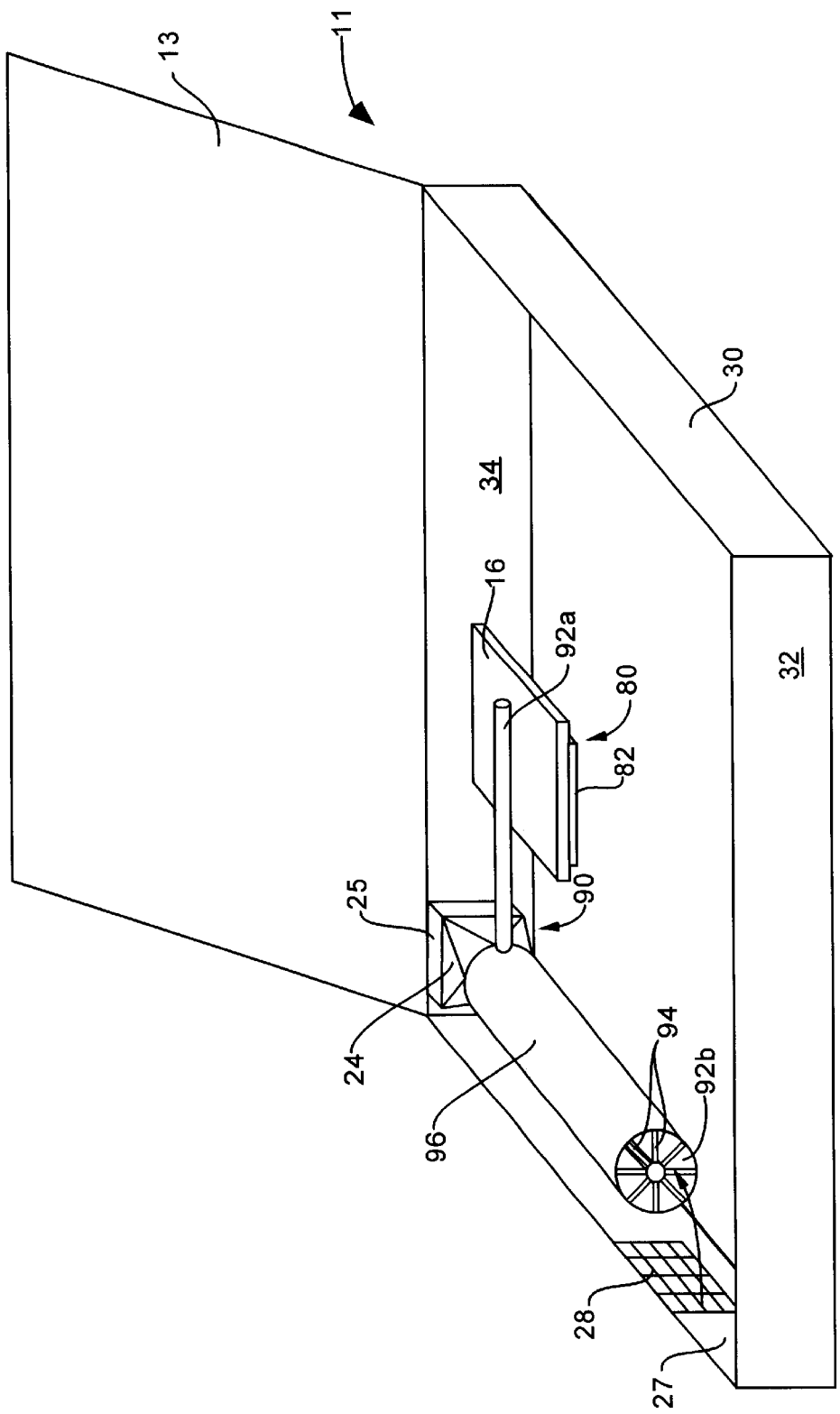
FIG. 8 is a perspective view of another embodiment of the present invention.

In FIG. 7, an alternative heat exchanger and heat pipe configuration is shown. In the preceding discussion, the condenser portion of the heat pipe was either thermally attached to the outer surface of the heat exchanger or supported within the heat exchanger cavity by a plurality of longitudinal fins, or other means. In the embodiment of FIG. 7, a heat pipe 90 is provided having an evaporator portion 92a and a condenser portion 92b. The evaporator portion 92a has a flat heat pipe configuration and is attached to the semiconductor substrate 82 of integrated circuit device 80. In an alternative embodiment, evaporator portion 92a includes a circular heat pipe configuration and is thermally coupled to the integrated circuit 80 through a thermally conductive plate/heatsink 16 as shown in FIG. 8. The condenser portion 92b has a circular heat pipe configuration and has one or more fins 94 extending outward from the heat pipe. Fins 94 increase the heat transfer area of condenser portion 92b, thereby increasing the heat transfer capability of apparatus. Condenser portion 92b is contained within a housing 96 which is used to direct a cooling medium, such as air, across fins 94.

Figure 9A:
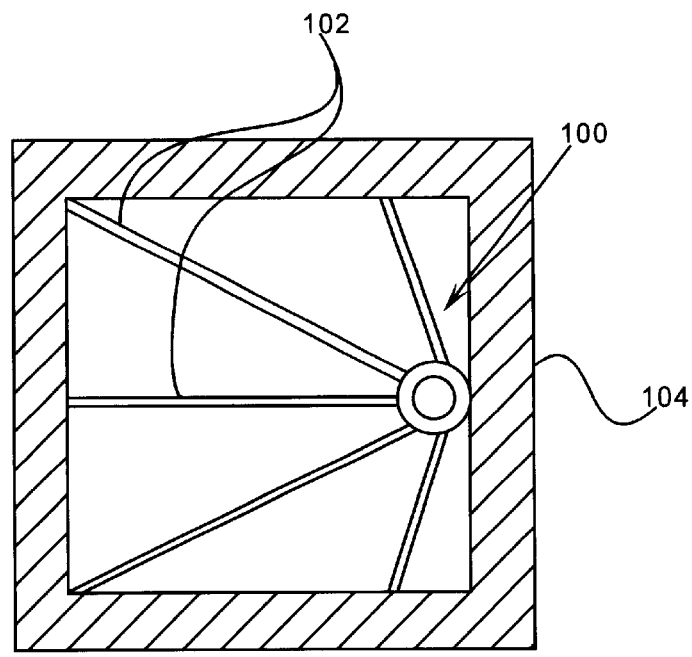
FIGS. 9A and 9B illustrate various finned heat pipe and heat exchanger configurations.
Figure 9B:
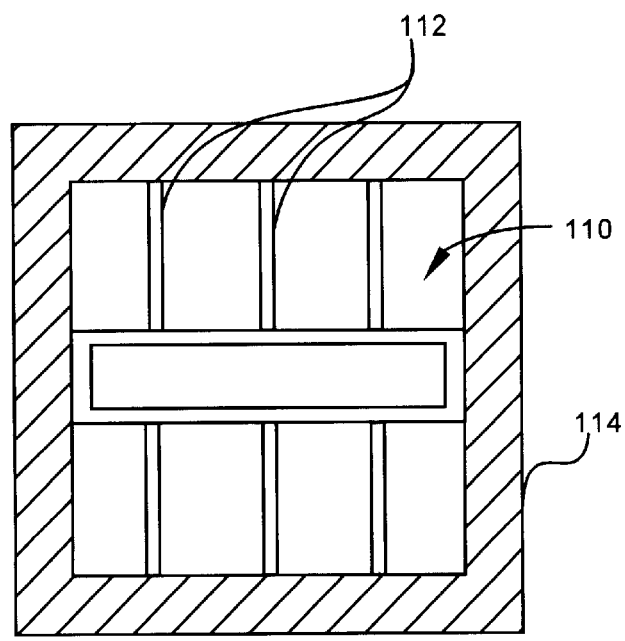

It is important to understand that the present invention is not limited to any particular heat pipe or fin configuration. FIGS. 9A and 9B illustrate other possible heat pipe configurations. FIG. 9A illustrates a front view of the condenser portion of a heat pipe 100 having radially extending, longitudinal fins 102. Heat pipe 100 is attached to the side wall of an air duct housing 104. In such an embodiment, housing 104 is preferrably made of a thermally conductive material, such as aluminum. FIG. 9B illustrate a front view of the condenser portion of a heat pipe 110 in yet another embodiment of the present invention. As illustrated, the condenser portion comprises a flat heat pipe configuration having longitudinal fins 112 extending outwardly from the heat pipe. The condenser portion is contained within a housing 114. The fins may be produced at the time the heat pipe manufactured by means of an extrusion process. Alternatively, the fins may be welded to the outer surface of the heat pipe.

Thus, an improved cooling system for a computer system enclosure has been described. Although the present invention has been described with reference to specific exemplary embodiments, it will be evident that various modifications and changes may be made to these embodiments without departing from the broader spirit and scope of the invention. Accordingly, the specifications and drawings are to be regarded in an illustrative rather than a restrictive sense.

What is claimed is:

1. A computer assembly comprising:
   an integrated circuit device comprising a semiconductor substrate;
   a heat exchanger;
   means for moving a cooling medium through said heat exchanger; and
   a heat pipe comprising a evaporator portion and a condenser portion, said evaporator portion being attached to said semiconductor substrate, said condenser portion being thermally coupled to said heat exchanger.

2. The computer system of claim 1 wherein said heat exchanger includes an enclosed duct with an outer surface and an inner surface, said condenser portion of said heat pipe thermally coupled to said outer surface of said enclosed duct.

3. The computer system of claim 2 further including members attached to said inner surface of said heat exchanger duct increasing the internal surface area of said heat exchanger.

4. The computer assembly of claim 3 wherein said members comprise convoluted fins.

5. The computer assembly of claim 3 wherein said members comprise plate fins.

6. The computer assembly of claim 3 wherein said members comprise pin fins.

7. The computer assembly of claim 2 wherein said means for moving a cooling medium through said heat exchanger includes a fan for directing air through said enclosed duct.

8. The computer assembly of claim 1 wherein said condenser portion of said heat pipe comprises a circular heat pipe and said evaporator portion of said heat pipe comprises a flat heat pipe.

9. The computer assembly of claim 8 wherein said evaporator portion and said semiconductor substrate have substantially the same shape.

10. The computer assembly of claim 1 wherein said semiconductor substrate comprises silicon.

11. The computer assembly of claim 1 wherein said heat exchanger includes an enclosed duct with inner and outer surfaces and said heat pipe extending through the center of said enclosed duct and further including a plurality of longitudinal radial fins extending between said heat pipe and the inner surface of said enclosed duct, supporting said heat pipe.

12. A computer assembly comprising:
an integrated circuit device comprising a semiconductor substrate;
an air duct;
air moving means for producing an air flow through said air duct; and
a heat pipe comprising a evaporator portion and a condenser portion, said evaporator portion being attached to said semiconductor substrate, said condenser portion being attached to said air duct.

13. The computer assembly of claim 12 wherein said air moving means comprises a fan.

14. The computer assembly of claim 12 wherein said condenser portion of said heat pipe comprises a circular heat pipe and said evaporator portion of said heat pipe comprises a flat heat pipe.

15. The computer assembly of claim 12 wherein said semiconductor substrate comprises silicon.

16. The computer system of claim 12 wherein said air duct has an outer surface and an enclosed inner surface, said condenser portion of said heat pipe in thermal contact with said outer surface of said air duct.

17. The computer assembly of claim 16 further comprising fins attached to said enclosed inner surface.

18. The computer assembly of claim 12 wherein said air duct includes an enclosed inner surface and an outer surface and said condenser portion of said heat pipe extending through the center of said air duct and further including a plurality of longitudinal radial fins extending between said heat pipe and said enclosed inner surface of said air duct.

19. Apparatus for cooling a heat generating component comprising:
a heat pipe having an evaporator portion and a condenser portion, said evaporator portion being thermally coupled to said heat generating component, said condenser portion having an outer surface with at least one fin protruding from said outer surface; and
means for moving a cooling medium across fin.

20. The apparatus of claim 19 wherein said heat generating component is an integrated circuit comprising a semiconductor substrate, said evaporator portion of said heat pipe being attached to said semiconductor substrate.

21. The apparatus of claim 19 wherein said means for moving a cooling medium includes a fan for producing an air flow across said fin.

22. The apparatus of claim 19 further comprising an enclosed duct surrounding said heat pipe and said at least one fin.

23. The apparatus of claim 22 wherein said means for moving a cooling medium includes a fan for producing an air flow through said enclosed duct.

24. An apparatus comprising:
a heat generating component;
a heat exchanger;
a fan positioned to move air through said heat exchanger;
a heat pipe having a first portion comprising an evaporator portion thermally coupled to said heat generating component and having a second portion comprising a condenser portion thermally coupled to said heat exchanger.

25. The apparatus of claim 24 wherein said heat exchanger is a duct that is an enclosed duct.

26. The apparatus of claim 25 wherein said duct includes a plurality of fin members.

27. The apparatus of claim 25 wherein said second portion of said heat pipe is thermally coupled to an outer surface of said duct.

28. The apparatus of claim 25 wherein said second portion of said heat pipe is thermally coupled to an inner surface of said duct.

29. The apparatus of claim 24 wherein said heat generating component comprises an integrated circuit having a semiconductor substrate, and wherein said first portion of said heat pipe is coupled to said semiconductor substrate.

* * * * *